United States Patent [19]
Yee et al.

[11] Patent Number: 5,610,495
[45] Date of Patent: Mar. 11, 1997

[54] CIRCUIT AND METHOD OF MONITORING BATTERY CELLS

[75] Inventors: Renwin J. Yee, Chandler; Troy L. Stockstad, Phoenix; Thomas D. Petty, Tempe, all of Ariz.

[73] Assignee: Motorola, Inc., Schaumburg, Ill.

[21] Appl. No.: 262,305

[22] Filed: Jun. 20, 1994

[51] Int. Cl.⁶ ............................ H01M 10/44; H01M 10/46
[52] U.S. Cl. ............................................. 320/6; 320/39
[58] Field of Search ................................. 320/6, 18, 29, 320/15, 30, 39, 40, 48, 35; 307/90

[56] References Cited

U.S. PATENT DOCUMENTS

| | | | |
|---|---|---|---|
| 4,217,645 | 8/1980 | Barry et al. | 320/48 X |
| 4,280,097 | 7/1981 | Carey et al. | 320/48 X |
| 4,385,269 | 5/1983 | Aspinwall et al. | 320/14 |
| 5,119,011 | 6/1992 | Lambert | 320/43 |
| 5,153,496 | 10/1992 | LaForge | 320/17 |
| 5,206,578 | 4/1993 | Nor | 320/18 X |
| 5,245,268 | 9/1993 | Wang | 320/35 |
| 5,352,968 | 10/1994 | Reni et al. | 320/35 |
| 5,504,415 | 4/1996 | Podrazhansky et al. | 320/18 |

*Primary Examiner*—Edward H. Tso
*Attorney, Agent, or Firm*—Robert D. Atkins

[57] ABSTRACT

A battery monitoring circuit (10) sequentially samples individual voltages across a string of serially coupled battery cells (12–18). A control circuit (32) controls first and second multiplexers (34,42) to sample each battery voltage for an over-voltage condition. A comparator (52) detects an over-voltage condition by comparing a divided down battery voltage against a reference. The conduction path through the battery cells is disabled upon detecting a fault condition by a transistor (26) in the battery cell conduction path. The battery cells are further sequentially sampled for an under-voltage fault. The comparator detects an under-voltage condition by comparing a second divided down battery voltage against the reference. The conduction path through the battery cells is disabled upon detecting a fault condition by a transistor (24) in the battery cell conduction path.

23 Claims, 3 Drawing Sheets

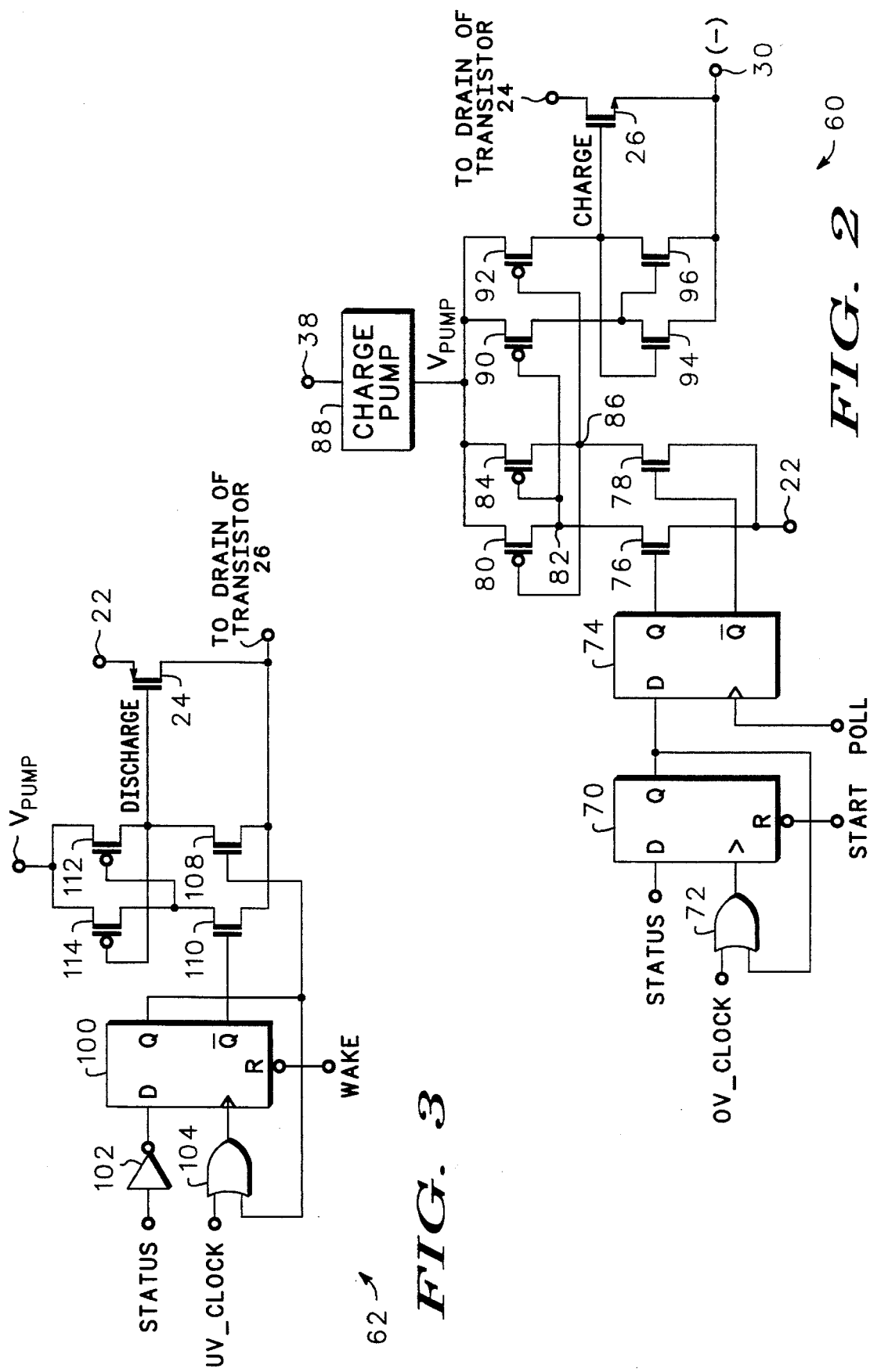

| MEASUREMENT | ENABLE | B13 | B12 | B11 | S0 | S1 | START | POLL | OV_CLOCK | UV_CLOCK |
|---|---|---|---|---|---|---|---|---|---|---|
| OV12 | 1 | 0 | 0 | 0 | 0 | 0 | ⎍ | 0 | ⎍ | 0 |
| OV14 | 1 | 0 | 0 | 1 | 0 | 1 | 0 | 0 | ⎍ | 0 |
| OV16 | 1 | 0 | 1 | 0 | 1 | 0 | 0 | 0 | ⎍ | 0 |
| OV18 | 1 | 0 | 1 | 1 | 1 | 1 | 0 | 0 | ⎍ | 0 |
| UV12 | 1 | 1 | 0 | 0 | 0 | 0 | 0 | ⎍ | 0 | ⎍ |
| UV14 | 1 | 1 | 0 | 1 | 0 | 1 | 0 | 0 | 0 | ⎍ |
| UV16 | 1 | 1 | 1 | 0 | 1 | 0 | 0 | 0 | 0 | ⎍ |
| UV18 | 1 | 1 | 1 | 1 | 1 | 1 | 0 | 0 | 0 | ⎍ |

CIRCUIT AND METHOD OF MONITORING BATTERY CELLS

BACKGROUND OF THE INVENTION

The present invention relates in general to battery protection and, more particularly, to a circuit and method of sampling the status of serially coupled battery cells.

Batteries are used in a wide variety of applications including digital pagers, cellular telephones and notebook computers. Lithium ion and polymer batteries are often selected for such applications because of their rechargeable characteristics, low weight and high energy density. A lithium ion battery cell typically provides a voltage of about 4.2 volts. Since many applications require 12 to 15 volts of operating potential, several battery cells may be serially coupled together in a battery pack to provide the needed operating potential. Once the batteries have been discharged by shelf life or during normal usage in an application, it is necessary to recharge the battery pack. A common problem experienced in many lithium ion and polymer battery applications occurs during the re-charge process where it is possible to over-charge one cell if another cell is mismatched or defective. The over-charging can cause catastrophic failures with potential safety problems for the end user. Moreover, it is possible for one or more of the serially coupled battery cells to be over-discharged which tends to reduce the capacity of the battery cells and battery pack. Both over-voltage and under-voltage conditions should be avoided.

In the prior art, battery protection and monitoring schemes have been developed that monitor the battery cells to determine under-charge or over-charge conditions. Most if not all battery protection circuits involve continuous monitoring all battery cells simultaneously to determine their status. The continuous monitoring consumes excessive power which is typically supplied by the battery pack. The prior art battery protection circuit thus reduces the shelf life and operating time between charges.

Hence, a need exists to monitor the individual cells of the battery pack without undue drain on the battery pack.

BRIEF DESCRIPTION OF THE DRAWING

FIG. 2 is a schematic diagram illustrating the over-voltage logic of FIG. 1;

FIG. 3 is a schematic diagram illustrating the under-voltage logic of FIG. 1;

DETAILED DESCRIPTION OF THE PREFERRED EMBODIMENT

Figure 1:
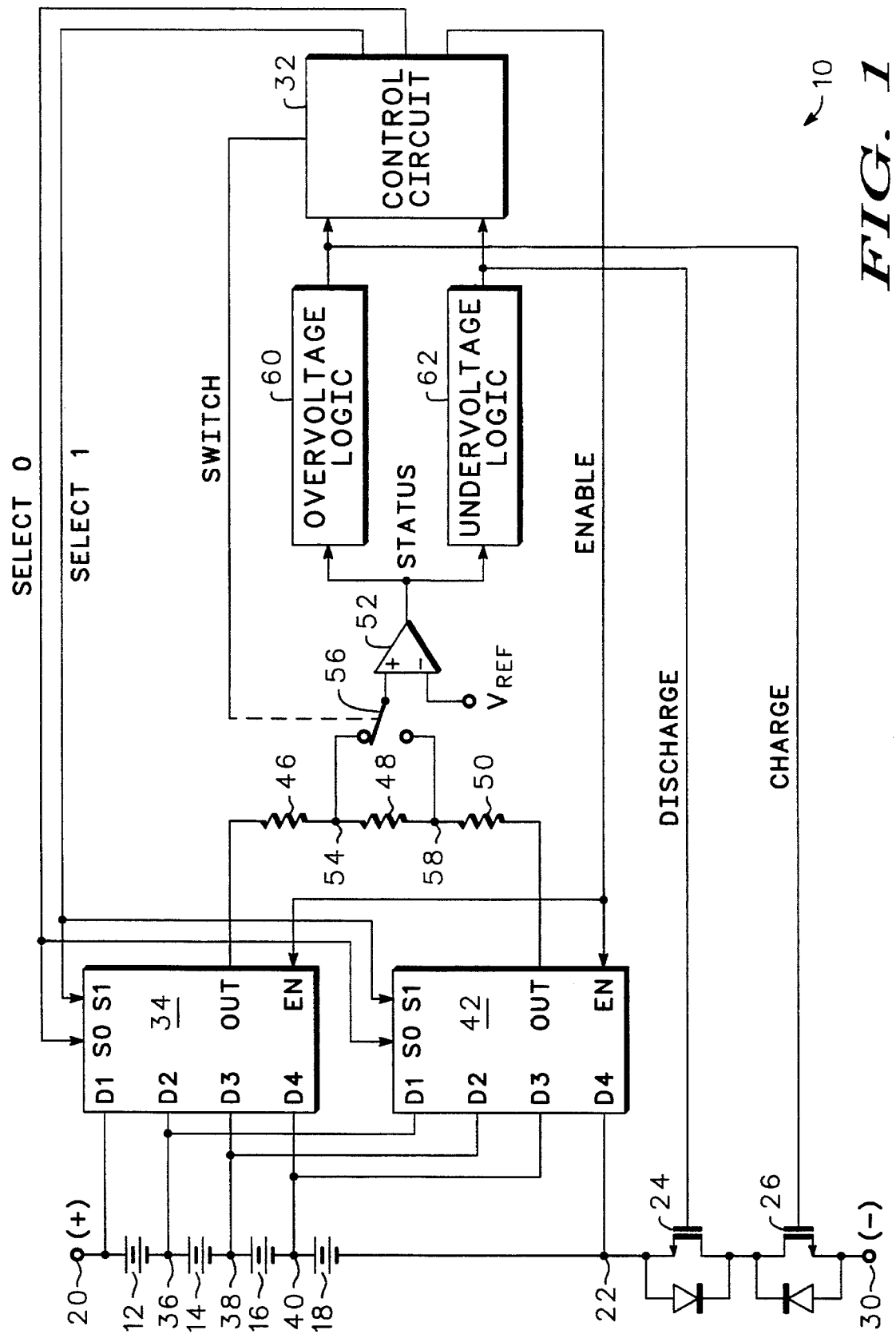
FIG. 1 is a schematic and block diagram illustrating a battery monitoring circuit for a battery pack.

Referring to FIG. 1, a battery monitoring circuit 10 is shown suitable for manufacturing as a monolithic integrated circuit (IC) using conventional integrated circuit processes. Battery cells 12, 14, 16 and 18 are serially coupled between power supply conductor 20 and node 22. Battery cells 12–18 are preferably lithium ion or polymer type rechargeable batteries, where the lithium ion cells operate at 4.2 volts and the polymer cells operate at 3.0 volts under a full charge. Node 22 is the source of MOSFET transistor 24. The drain of transistor 24 is coupled to the drain of transistor 26. The source of transistor 26 is coupled to power supply conductor 30. Power supply conductors 20 and 30 represent the positive and negative terminals of the battery pack formed by battery cells 12–18. Transistors 24 and 26 receive DISCHARGE and CHARGE control signals, respectively, from control circuit 32 to enable and disable the conduction path between power supply conductors 20 and 30. If the battery monitoring circuit described hereinafter determines that an over-voltage or under-voltage condition exists on any individual battery cell, then transistor 24 and/or transistor 26 disables the conduction path between power supply conductors 20 and 30. Transistors 24 and 26 may be placed external or integrated into the IC containing battery monitoring circuit 10.

Analog multiplexer 34 has a first data input D1 coupled to power supply conductor 20 and a second data input D2 coupled to node 36 at the interconnection between battery cells 12 and 14. Multiplexer 34 further includes a third data input D3 coupled to node 38 at the interconnection between battery cells 14 and 16, and a fourth data input D4 coupled to node 40 at the interconnection of battery cells 16 and 18. Analog multiplexer 42 has four data inputs D1–D4 also coupled to nodes 36, 38, 40 and 22, respectively.

Multiplexers 34 and 42 receive control signals SELECT0 and SELECT1 and an ENABLE control signal from control circuit 32. The output of multiplexer 34 is coupled to one side of serially coupled resistors 46, 48 and 50. The output of multiplexer 42 is coupled to the opposite side of the serially coupled resistors 46–50. A comparator circuit 52 has a non-inverting input terminal coupled by way of switch 56 to either the interconnection of resistors 46 and 48 at node 54 or to the interconnection of resistors 48 and 50 at node 58. Control circuit 32 controls switch 56 with the SWITCH control signal. The inverting input terminal of comparator 52 receives a reference potential $V_{REF}$ operating at 1.25 volts. The output of comparator 52 is coupled to inputs of over-voltage logic 60 and under-voltage logic 62. The output of over-voltage 60 and under-voltage logic 62 provide inputs to control circuit 32.

The operation of battery monitoring circuit 10 proceeds as follows. When the battery pack becomes discharged due to self-discharge of the battery cells or usage in a system, it is necessary to re-charge battery cells 12–18. An external power source, e.g. battery charger (not shown), is connected to power supply conductors 20 and 30 and a re-charge current is pumped into battery cells 12–18. Battery monitoring circuit 10 identifies when the battery cells reach an over-voltage status during charging. The over-charge condition must be detected and the charging process halted.

The control signals SELECT0 and SELECT1 controlling multiplexers 34 and 42 cycle between selecting data inputs D1, D2, D3 and D4 of each multiplexer to sequentially sample battery cells 12, 14, 16 and 18. In one state the control signals SELECT0 and SELECT1 select the D1 input of multiplexer 34 to pass the voltage at power supply conductor 20 to the top side of resistor 46. Simultaneously, the control signals SELECT0 and SELECT1 enable the D1 input of multiplexer 42 to pass the voltage at node 36 to the bottom side of resistor 50. Thus, the voltage across battery cell 12 appears across serial resistors 46–50. During the status check of battery cell 12, control circuit 32 further controls switch 56 to connect node 58 to the non-inverting input of comparator 52 to check for an over-voltage fault. The voltage at node 58 is a resistor divider ratio of the value of resistor 50 divided by the sum of resistors 46, 48 and 50. The value of resistors 46 is selected at 102.25 Kohms, and resistor 48 is set to 30.55 Kohms, while resistor 50 is set to 55 Kohms. If the voltage at node 58 exceeds the reference voltage $V_{REF}$, then the output of comparator 52 goes high indicating an over-voltage fault. If the voltage at node 58 is less than the reference voltage $V_{REF}$ then the output of comparator remains low indicating proper operation for battery cell 12.

With switch 56 still set to check over-voltage, the control signals SELECT0 and SELECT1 select the D2 inputs of multiplexers 34 and 42 to pass the voltage at node 36 to the top side of resistor 46 and the voltage at node 38 to the bottom side of resistor 50. Comparator 52 performs an over-voltage check of battery cell 14 as described above. The process repeats to select the D3 inputs of multiplexers 34 and 42 to pass the voltage at node 38 to the top side of resistor 46 and the voltage at node 40 to the bottom side of resistor 50. Comparator 52 performs an over-voltage check of battery cell 16. The control signals SELECT0 and SELECT1 finally select the D4 inputs of multiplexers 34 and 42 to pass the voltage at node 40 to the top side of resistor 46 and the voltage at node 22 to the bottom side of resistor 50. Comparator 52 performs an over-voltage check of battery cell 18.

Another potential problem is an under-voltage condition on any one battery cell. The under-voltage must be detected so that the battery pack can be disabled to prevent over-discharge of the under-voltage battery cell. Once each battery cell has been serially sampled for over-voltage, the control signals SELECT0 and SELECT1 cycle back to select the D1 inputs of multiplexers 34 and 42. Switch 56 switches to connect node 54 to the non-inverting input of comparator 52 to check for an under-voltage fault. Voltage at node 54 is the voltage across battery cell 12 reduced by the resistor divider ratio of resistor 48 plus resistor 50 divided by resistors 46, 48 and 50. If the voltage at node 54 is less than the reference voltage $V_{REF}$, then the output of comparator 52 goes low indicating an under-voltage fault. Alternately if the voltage at node 54 is greater than the reference $V_{REF}$ than the output of comparator 52 remains high indicating proper operation for battery cell 12. The process of checking under-voltage repeats for battery cells 14, 16 and 18 as the SELECT0 and SELECT1 control signals cycle through selecting the D2–D4 multiplexer inputs.

In an alternate embodiment, the process may sample for both over-voltage and under-voltage on each battery cell before moving on to the next battery cell. One important aspect of the present invention is the serial sampling of each battery cell for over-voltage and under-voltage. Battery monitoring circuit 10 checks one battery cell at a time to minimize drain on the battery pack.

Turning to FIG. 2, further detail of over-voltage logic circuit 60 is shown including flipflop 70 having a data input coupled for receiving the STATUS signal from the output of comparator 52. OR gate 72 has a first input receiving an OV_CLOCK signal and a second input coupled to the Q-output of flipflop 70. Flipflop 70 is reset by a logic zero START control signal at its reset input. The Q-output of flipflop 70 is further coupled to the data input of flipflop 74 which is clocked by a POLL control signal. The Q-output of flipflop 74 is coupled to the gate of transistor 76, while the $\overline{Q}$-output of flipflop 74 is coupled to the gate of transistor 78. The sources of transistors 76 and 78 are coupled to node 22 operating at ground potential. The drain of transistor 76 is coupled to the drain of transistor 80 at node 82. The drain of transistor 78 is coupled to the drain of transistor 84 at node 86. The gates of transistors 80 and 84 are coupled to nodes 86 and 82, respectively. The sources of transistors 80 and 84 are coupled to an output of charge pump 88. Charge pump 88 receives an input voltage ranging from 3.6 to 8.4 volts from node 38 and provides an output voltage $V_{PUMP}$ operating at 15 volts. The gate of transistor 90 is coupled to node 82, while the gate of transistor 92 is coupled to node 86. The sources of transistors 90 and 92 receive the $V_{PUMP}$ voltage from charge pump 88. The drain of transistor 90 is coupled to the drain of transistor 94 and to the gate of transistor 96. The drain of transistor 92 is coupled to the gate of transistor 94 and to the drain of transistor 96. The sources of transistors 94 and 96 are coupled to power supply conductor 30. The interconnection of the drains of transistors 92 and 96 provide the CHARGE control signal to the gate of transistor 26.

The operation of over-voltage logic circuit 60 proceeds as follows. The START control signal resets flipflop 70. Assuming the STATUS signal from comparator 52 is logic one indicating an over-voltage fault, an OV_CLOCK signal latches the logic one at the Q-output of flipflop 70. The output of OR gate 72 goes to logic one and disables further OV_CLOCK signals into flipflop 70. An over-voltage condition on any one cell is thus latched at the Q-output of flipflop 70 to prevent any further status checks of subsequent battery cells from overriding the over-voltage condition already detected. The POLL control signal from control signal 32 latches the logic one from the Q-output of flipflop 70 into flipflop 74. The POLL control signal is asserted after the over-voltage check of each battery cell 12–18. The logic one at the Q-output of flipflop 74 turns on transistor 76 and pulls node 82 low to turn on transistor 84 and pull node 86 high. The logic zero at the $\overline{Q}$-output of flipflop 74 turns off transistor 78 allowing node 86 to go high. Transistor 80 is off because of the high signal at node 86. The low voltage at node 82 turns on transistor 90 and pulls the gate of transistor 96 high toward the $V_{PUMP}$ voltage. Transistor 96 turns on and pulls the CHARGE control signal low. Transistor 92 is off because of the high voltage at node 86. Transistors 94 and 26 turn off with the low CHARGE control signal. Thus, the detected over-voltage condition causes transistor 26 to become non-conductive thereby breaking the conduction path between power supply conductors 20 and 30 and interrupting charge to battery cells 12–18.

Alternately, a logic zero STATUS signal latched at the Q-output of transistor 70 indicates a valid status check of the battery cell. The logic zero is latched into flipflop 74 when the POLL control signal is asserted at the completion of each cycle through the battery cells. The logic one at the $\overline{Q}$-output of flipflop 74 turns on transistor 78 and pulls node 86 low to turn on transistors 80 and 92. The logic zero at the Q-output of flipflop 74 turns off transistor 76 and allows node 82 to go high thereby turning off transistors 84 and 90. The CHARGE control signal goes high to turn on transistors 94 and in turn disable transistor 96. The high CHARGE control signal also enables transistor 26 and the conduction path between power supply conductors 20 and 30 to allow charging of battery cells 12–18.

In FIG. 3, under-voltage logic circuit 62 is shown including flipflop 100 having a data input receiving the STATUS output signal from comparator 52 inverted by inverter 102. OR gate 104 has a first input receiving an UV_CLOCK signal and a second input coupled to the Q-output of flipflop 100. Flipflop 100 is reset by a logic zero WAKE control signal from control circuit 32 applied to its reset input. The Q-output of flipflop 100 is coupled to the gate of transistor 108, while the $\overline{Q}$-output of flipflop 100 is coupled to the gate of transistor 110. The sources of transistors 108 and 110 are coupled to node 22. The drain of transistor 108 is coupled to the drain of transistor 112 and to the gate of transistor 114 and to the gate of transistor 24. Transistors 108 and 112 control the DISCHARGE control signal. The drain of transistor 110 is coupled to the drain of transistor 114 and to the gate of transistor 112. The sources of transistors 112 and 114 receive the $V_{PUMP}$ voltage from charge pump 88.

The operation of under-voltage logic circuit 62 proceeds as follows. A logic zero STATUS signal at the output of comparator 52 indicates an under-voltage condition for the battery cell being sampled. The logic zero is inverted by inverter 102 and latched into flipflop 100 as a logic one during the next UV_CLOCK signal. The logic one at the Q-output of flipflop 100 produces a logic one at the output of OR gate 104 and disables further UV_CLOCK signals from reaching flipflop 100. The logic zero at the $\overline{Q}$-output of flipflop 100 turns off transistor 110. The logic one from the Q-output of flipflop 100 turns on transistor 108 and pulls the DISCHARGE control signal low to turn on transistor 114. Transistor 112 is off with the high signal at the drain of transistor 114. Thus, a detected under-voltage condition sets the DISCHARGE control signal low and turns off transistor 24 to break the conduction path between power supply conductors 20 and 30 and isolate battery cells 12–18 from the external system.

Alternately, a logic one STATUS signal at the output of comparator 52 following a sampling sequence latches a logic zero at the Q-output of flipflop 100 to turn off transistor 108. The logic one $\overline{Q}$-output of flipflop 100 turns on transistor 110 and in turn transistor 112 to pull the DISCHARGE control signal high toward the $V_{PUMP}$ voltage. Transistor 114 is off with the high DISCHARGE control signal. Transistor 24 conducts to enable the conduction path between power supply conductors 20 and 30 for normal operation of the battery pack.

Figures 4, 5:
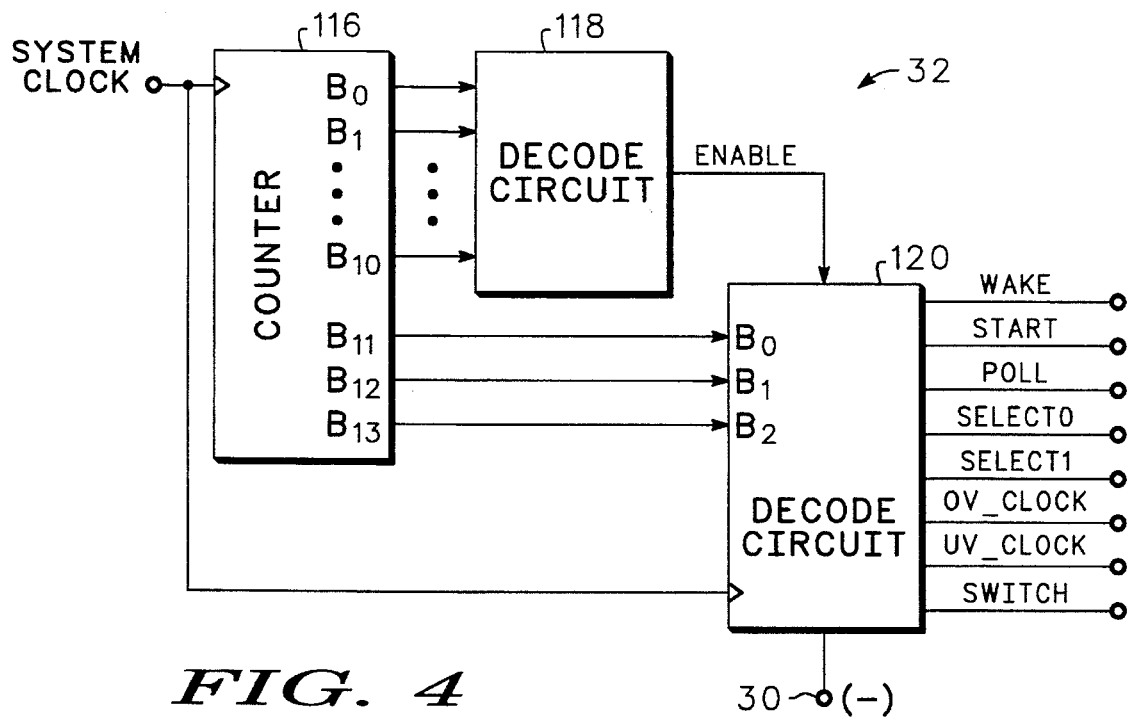
FIG. 4 is a block diagram illustrating the control circuit of FIG. 1.
FIG. 5 is a table illustrating the logical operation of the control circuit of FIG. 1.

Turning to FIG. 4, control circuit 32 is shown including 14-bit counter 116 having a clock input receiving a SYSTEM CLOCK operating at 10 KHz. Counter 116 includes outputs labeled B0–B13. Outputs B0 through B10 are coupled to decode circuit 118 that provides a logic one ENABLE output when counter outputs B0 through B10 are all logic one. Decode circuit 118 may be implemented with cascaded AND gates. The ENABLE output signal from decode circuit 118 is applied to an enable input of decode circuit 120, and to enable inputs of multiplexers 34 and 42 of FIG. 1. Output bits B11, B12 and B13 are coupled to inputs B0, B1 and B2 of decode circuit 120.

The operation of decode circuit 120 is shown in table 1. Measurement OV12 refers to over-voltage check of battery cell 12, measurement OV14 refers to over-voltage check of battery cell 14, and so on. Measurement UV12 refers to under-voltage check of battery cell 12, measurement UV14 refers to under-voltage check of battery cell 14, and so on. Counter 116 is initialized with logic zeros and counts up by way of the SYSTEM CLOCK until reaching all ones at which point it wraps around to all zeros. Until bit locations B0 through B10 of counter 116 reach all logic ones, the ENABLE control signal remains logic zero thereby disabling operation of decode circuit 120 and multiplexers 34 and 42. Once decode circuit 120 is enabled by all logic ones from B0–B10, the most significant bits B11, B12 and B13 of counter 116 cycle through the various states of decode circuit 120 as described in table 1. When the B13 output of counter 116 is logic zero, battery monitoring circuit 10 is operating to perform an over-voltage test of battery cells 12–18. Bits 11 and 12 of counter 116 increment the control signals SELECT0 and SELECT1 to cycle through each of the D1–D4 inputs of multiplexers 34 and 42 and check the individual battery cells. When counter 116 increments bit B13 to logic one, the under-voltage test begins and bits 11 and 12 increment the SELECT0 and SELECT1 control signals to multiplexers 34 and 42 to again cycle through each of the D1–D4 inputs of multiplexers 34 and 42 and check the individual battery cells.

Decode circuit 120 further provides the WAKE control signal that is logic one when power supply conductor 30 is above ground potential. The WAKE control signal goes to logic zero upon sensing power supply conductor 30 below ground potential. The START control signal pulses to logic zero when the ENABLE control signal from decode circuit 118 is logic one and the most significant bits B11, B12 and B13 are logic zero. The POLL control signal pulses to logic one when the ENABLE control signal from decode circuit 118 is logic one and the most significant bits B11, B12, and B13 are "001". The OV_CLOCK signal is active when the most significant bit B13 is logic zero operating in phase with the SYSTEM CLOCK. The UV_CLOCK signal is active when the most significant bit B13 is logic one operating in phase with the SYSTEM CLOCK. The SWITCH control signal activates switching circuit 56 to connect the non-inverting input of comparator 52 to node 58 when ENABLE is logic one and bit B13 is logic zero. The SWITCH control signal further activates switching circuit 56 to connect the non-inverting input of comparator 52 to node 54 when ENABLE is logic one and bit B13 is logic one.

By now it should be appreciated that the present invention provides a battery monitoring circuit to sample over-voltage and under-voltage conditions on individual battery cells. An over-voltage or under-voltage fault disables the conduction path through the battery pack. The sampling process to monitor the battery cells saves power consumption drawn on the battery pack.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A battery monitoring circuit, comprising:

first and second multiplexers each having a first input, a second input and a select input, said first input of said first multiplexer being coupled for receiving a first battery voltage, said second input of said first multiplexer being coupled for receiving a second battery voltage, said first input of said second multiplexer being coupled for receiving said second battery voltage, said second input of said second multiplexer being coupled for receiving a third battery voltage, said select inputs being coupled for receiving a select signal that selects between said first and second inputs of said first and second multiplexers to sequentially sample said first and second battery voltages;

first and second conduction elements serially coupled between outputs of said first and second multiplexers for developing a voltage at an interconnection of said first and second conduction elements; and a comparator having first and second inputs, and an output, said first input being coupled to said interconnection of said first and second resistors at, said second input being coupled for receiving a reference potential, said output providing a status signal indicating status of said first and second battery voltages.

2. The battery monitoring circuit of claim 1 further including a charging conduction path coupled between first and second power supply conductors, said charging conduction path providing said first and second battery voltages.

3. The battery monitoring circuit of claim 2 further including circuit means responsive to said status signal for disabling said charging conduction path upon detecting a predetermined state of said status signal that indicates a fault condition.

4. The battery monitoring circuit of claim 3 further including:

first and second transistors each having a drain and a source serially coupled in said charging conduction path;

an over-voltage logic circuit responsive to said status signal for providing a charge control signal to a gate of said first transistor; and an under-voltage logic circuit responsive to said status signal for providing a discharge control signal to a gate of said second transistor.

5. A battery monitoring circuit, comprising:

first and second multiplexers each having a first input, a second input and a select input, said first input of said first multiplexer being coupled for receiving a first battery voltage, said second input of said first multiplexer being coupled for receiving a second battery voltage, said first input of said second multiplexer being coupled for receiving said second battery voltage, said second input of said second multiplexer being coupled for receiving a third battery voltage, said select inputs being coupled for receiving a select signal that selects between said first and second inputs to sequentially sample said first and second battery voltages;

first, second, and third conduction elements serially coupled between outputs of said first and second multiplexers for developing a first voltage at an interconnection of said first and second conduction elements at a first node and a second voltage at an interconnection of said second and third conduction elements at a second node;

a comparator having first and second inputs, and an output, said second input being coupled for receiving a reference potential, said output providing a status signal indicating status of said first and second battery voltages;

a charging conduction path coupled between first and second power supply conductors for providing said first, second and third battery voltages;

circuit means responsive to said status signal for disabling said charging conduction path upon detecting a predetermined state of said status signal that indicates a fault condition;

and a switching circuit with first and second input terminals and an output terminal, said first input terminal being coupled to said first node, said second input terminal being coupled to said second node, said output terminal being coupled to said first input of said comparator.

6. The battery monitoring circuit of claim 5 wherein said circuit means includes:

first and second transistors each having a drain and a source serially coupled in said charging conduction path;

an over-voltage logic circuit responsive to said status signal for providing a charge control signal to a gate of said first transistor;

an under-voltage logic circuit responsive to said status signal for providing a discharge control signal to a gate of said second transistor; and a control circuit responsive to a system clock for generating said select signal for said first and second multiplexers.

7. A circuit for monitoring battery voltages, comprising:

a charging conduction path providing first and second battery voltages;

a multiplexer having a first input coupled for receiving said first battery voltage and a second input coupled for receiving said second battery voltage;

a comparator having a first input coupled to a first output of said multiplexer, and a second input coupled for receiving a reference potential, and an output providing a status signal indicating a condition of said first battery voltage; and a charging protection circuit responsive to said status signal for disabling said charging conduction path upon detecting a predetermined condition of said status signal.

8. The circuit of claim 7 wherein said charging protection circuit includes:

a first transistor having first and second conduction terminals serially coupled in said charging conduction path; and an over-voltage logic circuit responsive to said status signal for providing a charge control signal to a control terminal of said first transistor.

9. The circuit of claim 7 wherein said charging protection circuit includes:

a first transistor having first and second conduction terminals serially coupled in said charging conduction path; and an under-voltage logic circuit responsive to said status signal for providing a discharge control signal to a control terminal of said first transistor.

10. The circuit of claim 7 wherein said multiplexer further includes a select input coupled for receiving a select signal that selects between said first and second inputs of said multiplexer to sequentially sample said first and second battery voltages.

11. The circuit of claim 10 further including a control circuit responsive to a system clock signal for generating said select signal to said select input of said multiplexer.

12. The circuit of claim 7 further including:

said multiplexer having a third input coupled for receiving said second battery voltage and a fourth input coupled for receiving a third battery voltage;

first, second, and third conduction elements serially coupled between said first output of said multiplexer and a second output of said multiplexer; and a switching circuit having a first input terminal coupled to an interconnection of said first and second conduction elements, a second input terminal coupled to an interconnection of said second and third conduction elements, and an output terminal coupled to said first input of said comparator.

13. The circuit of claim 8 wherein said over-voltage logic circuit includes:

a first flipflop having a data input coupled for receiving said status signal, and a reset input coupled for receiving a start control signal;

an OR gate having a first input coupled for receiving an over-voltage clock signal, a second input coupled to an output of said first flipflop, and an output coupled to a clock input of said first flipflop;

a second flipflop having a data input coupled to said output of said first flipflop, and a clock input coupled for receiving a poll control signal;

a charge pump providing a pump voltage at an output;

a second transistor having a gate coupled to a first complementary output of said second flipflop, and a source coupled to said charging conduction path;

a third transistor having a gate coupled to a second complementary output of said second flipflop, and a source coupled to said charging conduction path;

a fourth transistor having a gate coupled to a drain of said third transistor, a drain coupled to a drain of said second transistor, and a source coupled for receiving said pump voltage; and a fifth transistor having a gate coupled to said drain of said second transistor, a drain coupled to said drain of said third transistor, and a source coupled for receiving said pump voltage.

14. The circuit of claim 13 wherein said over-voltage logic circuit further includes:

a sixth transistor having a gate coupled to said drain of said second transistor, and a source coupled for receiving said pump voltage;

a seventh transistor having a gate coupled to said drain of said third transistor, and a source coupled for receiving said pump voltage;

an eighth transistor having a gate coupled to a drain of said seventh transistor, a drain coupled to a drain of said sixth transistor, and a source coupled to said second power supply conductor; and a ninth transistor having a gate coupled to said drain of said sixth transistor, a drain coupled to said drain of said seventh transistor, said drain further providing said charge control signal to said control terminal of said first transistor, and a source coupled to said second power supply conductor.

15. The circuit of claim 9 wherein said under-voltage logic circuit includes:

an inverter having an input coupled for receiving said status signal and having an output for providing an inverted status signal;

a first flipflop having a data input coupled to said output of said inverter for receiving said inverted status signal, and a reset input coupled for receiving a wake control signal;

an OR gate having a first input coupled for receiving an under-voltage clock signal, a second input coupled to a first complementary output of said first flipflop, and an output coupled to a clock input of said first flipflop;

a charge pump providing a pump voltage at an output;

a second transistor having a gate coupled to a second complementary output of said first flipflop, and a source coupled to said first conduction terminal of said first transistor;

a third transistor having a gate coupled to said first complementary output of said first flipflop, and a source coupled to said first conduction terminal of said first transistor;

a fourth transistor having a gate coupled to a drain of said third transistor, a drain coupled to a drain of said second transistor, and a source coupled for receiving said pump voltage; and a fifth transistor having a gate coupled to said drain of said second transistor, a drain coupled to said drain of said third transistor, said drain further providing said discharge control signal to said control terminal of said first transistor, and a source coupled for receiving said pump voltage.

16. A battery monitoring circuit, comprising:

a charging conduction path providing first and second battery voltages;

a first multiplexer having a first input coupled for receiving said first battery voltage and a second input coupled for receiving said second battery voltage;

a comparator having a first input coupled to an output of said first multiplexer, and a second input coupled for receiving a reference potential, and an output providing a status signal indicating a condition of said first battery voltage; and circuit means responsive to said status signal for disabling said charging conduction path upon detecting a predetermined condition of said status signal.

17. The battery monitoring circuit of claim 16 wherein said circuit means includes:

a first transistor having first and second conduction terminals serially coupled in said charging conduction path; and an over-voltage logic circuit responsive to said status signal for providing a charge control signal to a control terminal of said first transistor.

18. The battery monitoring circuit of claim 16 wherein said switching circuit includes:

a first transistor having first and second conduction terminal serially coupled in said charging conduction path; and an under-voltage logic circuit responsive to said status signal for providing a discharge control signal to a control terminal of said first transistor.

19. The battery monitoring circuit of claim 16 further including:

a second multiplexer having a first input coupled for receiving a second battery voltage and a second input coupled for receiving a third battery voltage;

first, second, and third conduction elements serially coupled between said output of said first multiplexer and an output of said second multiplexer; and a switching circuit having a first input terminal coupled to an interconnection of said first and second conduction elements, a second input terminal coupled to an interconnection of said second and third conduction elements, and an output terminal coupled to said first input of said comparator.

20. The battery monitoring circuit of claim 19 wherein said first and second multiplexers further include a select input coupled for receiving a select signal that selects between said first and second inputs of said first and second multiplexers to sequentially sample said first and second battery voltages.

21. The battery monitoring circuit of claim 20 further including a control circuit responsive to a system clock signal for generating said select signal to said select input of said first and second multiplexers.

22. A method of monitoring serial battery voltages, comprising the steps of:

monitoring first and second battery voltages serially connected in a charging conduction path;

sampling said first battery voltage;

sampling said second battery voltage;

comparing said first battery voltage against a reference potential to determine status of said first battery voltage;

comparing said second battery voltage against said reference potential to determine status of said second battery voltage; and disabling said charging conduction path through said first and second battery voltages upon detecting a predetermined status of said first or second battery voltages.

23. The method of claim 22 further comprising the steps of:

checking for an over-voltage condition of said first battery voltage;

checking for said over-voltage condition of said second battery voltage;

checking for an under-voltage condition of said first battery voltage; and checking for said under-voltage condition of said second battery voltage.

* * * * *